United States Patent
Mück et al.

(12) 
(10) Patent No.: US 7,001,959 B2
(45) Date of Patent: Feb. 21, 2006

(54) POLYOXYMETHYLENE COPOLYMERS, THEIR PREPARATION AND USE

(75) Inventors: Karl-Friedrich Mück, Wiesbaden (DE); Klaus Kurz, Kelsterbach (DE); Michael Hoffmockel, Niedernhausen (DE)

(73) Assignee: Ticona GmbH, (DE)

( * ) Notice: Subject to any disclaimer, the term of this patent is extended or adjusted under 35 U.S.C. 154(b) by 0 days.

(21) Appl. No.: 10/700,195

(22) Filed: Nov. 3, 2003

(65) Prior Publication Data

US 2004/0097691 A1 May 20, 2004

(30) Foreign Application Priority Data

Nov. 5, 2002 (DE) ................ 102 51 332

(51) Int. Cl.
*C08G 65/00* (2006.01)

(52) U.S. Cl. ........... 525/410; 525/414; 525/398; 528/230; 528/232; 528/248; 528/249; 528/250

(58) Field of Classification Search ........... 525/410, 525/414, 398; 528/230, 232, 248, 249, 250
See application file for complete search history.

(56) References Cited

U.S. PATENT DOCUMENTS

| | | | | |
|---|---|---|---|---|
| 3,754,053 A | | 8/1973 | Kray et al. | |
| 4,377,667 A | * | 3/1983 | Sakurai et al. | 525/400 |
| 4,427,807 A | * | 1/1984 | Zimmerman et al. | 523/466 |
| 4,431,794 A | | 2/1984 | Sadlowski et al. | |
| 5,587,449 A | | 12/1996 | Fleischer et al. | |
| 2002/0016395 A1 | | 2/2002 | Niino et al. | |
| 2003/0018104 A1 | * | 1/2003 | Mours et al. | 523/326 |

FOREIGN PATENT DOCUMENTS

| | | |
|---|---|---|
| DE | 1520106 | 1/1970 |
| DE | 4432575 | 3/1996 |
| EP | 0 080 656 | 6/1983 |
| GB | 807589 | 1/1959 |
| GB | 1031702 | 6/1966 |
| JP | 04306215 | 10/1992 |

* cited by examiner

*Primary Examiner*—James J. Seidleck
*Assistant Examiner*—Irina S. Zemel
(74) *Attorney, Agent, or Firm*—Connolly Bove Lodge & Hutz

(57) ABSTRACT

Copolymers are described containing blocks of the structural repeat units of the formula I and blocks containing structural units of the formula II $$[\text{—O—CH}_2\text{—}]_x, \quad (I)$$

$$[\text{—O—R}^1\text{—}], \quad (II)$$

where $R^1$ is a divalent radical derived from a hydroxy-terminated aliphatic or cycloaliphatic oligomer or polymer which, where appropriate, has ether groups and/or carbonyloxy groups in the chain, and x is a whole number, at least 10.

The copolymers may be used for producing moldings.

15 Claims, No Drawings

POLYOXYMETHYLENE COPOLYMERS, THEIR PREPARATION AND USE

The present invention relates to novel copolyoxymethylenes, and also to their preparation and use, in particular as a molding composition for injection molding and extrusion, for producing moldings of any type.

Polyoxymethylene (also termed "POM" below) is a high-performance polymer with good mechanical properties. However, its toughness is unsatisfactory for certain applications, and in some applications impact modifiers are therefore added to POM. Examples of these are elastomeric polyurethanes.

Attempts have previously been made to influence the impact strength of POM by way of the controlled incorporation of co-components. However, these attempts have hitherto been unsuccessful.

A process has now been found which permits the incorporation of selected co-components into POM and which gives impact-modified block copolymers.

The invention provides copolymers containing polyoxymethylene blocks of the structural repeat units of the formula I and blocks containing structural units of the formula II $$[—O—CH_2—]_x \qquad (I),$$

$$[—O—R^1—] \qquad (II),$$

where $R^1$ is a divalent radical derived from a hydroxy-terminated aliphatic or cycloaliphatic oligomer or polymer which, where appropriate, has ether groups and/or carbonyloxy groups in the chain, and x is a whole number, at least 10.

The copolymers of the invention contain blocks composed of homo- or copolyoxymethylenes and blocks of the formula II.

The proportion of the blocks composed of homo- or copolyoxymethylenes in the copolymer of the invention is usually from 70 to 99% by weight, preferably from 80 to 95% by weight, and the proportion of structural repeat units of the formula II is usually from 1 to 30% by weight, preferably from 5 to 20% by weight, based on the copolymer.

The polyoxymethylene blocks ("POM blocks") are generally unbranched linear blocks which generally contain at least 80% by weight, preferably at least 90% by weight, of oxymethylene units (—CH$_2$—O—).

The molecular weights of the POM blocks in the copolymers of the invention may vary within a wide range. x is typically in the range from 500 to 10.000, preferably from 1.500 to 5.000.

The term polyoxymethylene blocks here encompasses not only blocks which derive from homopolymers of formaldehyde or of its cyclic oligomers, for example of trioxane or of tetroxane but also blocks which derive from copolymeric components.

Blocks which derive from copolymeric components are polymeric components which derive from formaldehyde or from its cyclic oligomers, in particular from trioxane, and from cyclic ethers, from cyclic acetals, and/or from linear polyacetals. These blocks have been arranged at the end of a block copolymer and/or have been incorporated between blocks of the formula II.

The preparation of these homo- or copolyoxymethylene blocks is known per se to the person skilled in the art, and is described in the literature.

The homopolymer blocks generally derive from formaldehyde or trioxane via polymerization, preferably in the presence of suitable catalysts.

In the block copolymers of the invention, preference is given to copolymer blocks, in particular those which, besides the —CH$_2$—O— repeat units also contain up to 50 mol %, preferably from 0.1 to 20 mol %, and in particular from 0.5 to 10 mol %, based on the copolymer block, of co-components, for example those which derive from ethylene oxide, propylene 1,2-oxide, butylene 1,2-oxide, butylene 1,3-oxide, 1,3-dioxane, 1,3-dioxolane, and 1,3-dioxepan.

Particular preference is given to block copolymers in which polyoxymethylene blocks having from 99.5 to 95 mol % of structural repeat units of the formula I, preferably derived from trioxane, and from 0.5 to 5 mol % of structural repeat units derived from one of the above-mentioned comonomers are present.

Preference is given to copolymers in which the polyoxymethylene blocks contain not only the structural repeat units of the formula I but also structural repeat units of the formula III $$—(C_yH_{2y}—O—)_z \qquad (III),$$

where y is a whole number from 2 to 4, and z is a whole number from 1 to 3.

Other suitable POM blocks are structural repeat units which, by way of example, are prepared by reacting trioxane with one of the cyclic ethers described above and with a third monomer, preferably a bifunctional compound of the formula $R^2$—CH$_2$—Z—CH$_2$—$R^{2'}$, where $R^2$ and $R^{2'}$, independently of one another, are radicals of the formula IVa, IVb, or IVc

(IVa)

(IVb)

(IVc)

where Z is a chemical bond, —O—, or —O—$R^3$—O— ($R^3$=C$_2$–C$_8$-alkylene or C$_2$–C$_8$-cycloalkylene).

Preferred monomers of this type are ethylene diglycide, diglycidyl ether, and diethers composed of glycidyl compounds and formaldehyde, dioxane, or trioxane in a molar ratio of 2:1, and also diethers composed of 2 mol of glycidyl compound and 1 mol of an aliphatic diol having from 2 to 8 carbon atoms, for example the diglycidyl ethers of ethylene glycol, 1,4-butanediol, 1,3-butanediol, cyclobutane-1,3-diol, 1,2-propanediol, or cyclohexane-1,4-diol, or diglycerol diformal, to mention just a few examples.

Besides the structural repeat units of the formula I and, where appropriate, other co-components of the POM blocks, the block copolymers of the invention contain structural repeat units of the formula II defined above, covalently bonded to the POM blocks.

Very generally, structural repeat units of the formula II derive from hydroxy-terminated aliphatic or cycloaliphatic oligomers or polymers whose chain contains, where appropriate, ether groups and/or carbonyloxy groups.

These may be divalent straight-chain or branched aliphatic oligomeric or polymeric hydrocarbon radicals which preferably contain ethylenically unsaturated bonds, for example radicals derived from hydroxy-terminated polybutadiene. However, they may also be aliphatic and/or cycloaliphatic polyether oligomers or polyether polymers, or aliphatic and/or cycloaliphatic polyester oligomers or polyester polymers, these having termination by hydroxy groups.

For the purposes of this description, the term "oligomers" means polymers which contain from five to ten successive structural repeat units, for example ethylene glycol units. Polymers having more than ten successive structural units are termed "polymers" for the purposes of this description.

Without adopting any particular theory, it is assumed that these oligomers or polymers are incorporated into the POM blocks via chain-transfer reactions.

These oligomers or polymers may be unsubstituted, or may have substitution with additional aliphatic and/or cycloaliphatic radicals.

Examples of substituents are alkyl groups having from one to six carbon atoms, or cycloalkyl groups having from five to six ring carbon atoms.

Examples of oligomers or polymers which form the basis for the blocks of the formula II are polyalkylene ethers, such as polyethylene glycol, polypropylene glycol, polyethyleneypropylene glycols, or polytetrahydrofuran; and hydroxy-terminated polybutadiene.

Preference is given to copolymers containing the structural repeat units of the formulae I, II, and, where appropriate, III, where $R^1$ is a —($C_mH_{2m}$—O—$)_r$—$C_mH_{2m}$— radical, m is a whole number from 2 to 4, and r is a whole number from 20 to 1.500, preferably from 50 to 1.000.

Very particular preference is given to copolymers in which m is 2.

The preparation of the copolymers of the invention is based on the finding that the incorporation of the blocks of the structural repeat units becomes possible if, during the polymerization, the resultant homo- or copolyoxymethylenes can be held in solution, or at least in a condition having sufficiently fine distribution to permit the incorporation of these blocks.

Under polymerization conditions which are usual per se, for example at 70° C. and atmospheric pressure, the resultant POM precipitates from the reaction solution, and there is severe hindrance to uniform incorporation of other components by polymerization.

The bulk polymerization of oxymethylene polymers at elevated pressure and elevated temperature has previously been described, for example in EP-A-080,656 or in DE-A-44 31 575. However, these documents give no indication of the preparation of block copolymers.

The invention therefore also provides a process for preparing the copolymer defined above, containing the structural repeat units of the formulae I and II, encompassing the following measures:
i) forming an initial charge from monomers which form —O—$CH_2$— units together with monomers of the formula V

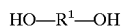 (V), where $R^1$ is as defined above, together with a catalyst usually used for polymerizing the monomers forming the —O—$CH_2$— units, and, where appropriate, together with a solvent, and/or with regulators, and
ii) carrying out the copolymerization at a temperature of from 120 to 300° C. and at a pressure of from 2 to 500 bar.

Examples of monomers forming —O—$CH_2$— units, and also of monomers of the formula V, have been listed at an earlier stage above.

In bulk polymerization, the polymerization mixture is preferably in fluid form; operations may also be carried out in inert solvents as an alternative to this. Examples of these are aliphatic, cycloaliphatic, or halogenated aliphatic hydrocarbons, or glycol ethers.

The molecular weight of the block copolymer may, where appropriate, be adjusted by way of the regulators usually used during POM preparation, and/or by way of the selection of the molecular weight of the co-component of the formula V.

Examples of regulators which may be used are acetals and, respectively, formals of monohydric alcohols, the alcohols themselves, or small amounts of water which function as chain-transfer agent. The amounts usually used as the regulators are up to 10.000 ppm, preferably from 10 to 3.000 ppm.

Catalysts or initiators which may be used are the cationic initiators usually used during the preparation of polyoxymethylenes. Examples of these are protonic acids, such as fluorinated or chlorinated alkyl- and arylsulfonic acids, e.g. trifluoromethanesulfonic acid, trifluoromethanesulfonic anhydride, or heteropolyacids, such as tungstophosphoric acids, or Lewis acids, e.g. stannic tetrachloride, arsenic pentafluoride, phosphorus pentafluoride, and boron trifluoride, and also their complex compounds and salt-like compounds, e.g. boron trifluoride etherates and triphenylmethyl hexafluorophosphate.

The usual amounts of the catalysts or initiators used are from 0.01 to 1.000 ppm, preferably from 0.03 to 10 ppm.

According to the invention, the selection of pressure and temperature in the polymerization zone is to be such that monomers and polymer are present with homogeneous or finely dispersed distribution, preferably completely dissolved in one another, or at least distributed sufficiently finely as to give a dispersion which retains the possibility of uniform incorporation of the co-components. This is the case at the values given above for the reaction pressure and the reaction temperature.

The copolymerization preferably takes place at temperatures of from 130 to 200° C. and at pressures of from 5 to 50 bar.

The polymerization time may vary within a wide range, and is typically in the range from 0.1 to 20 minutes. The polymerization time is preferably from 0.4 to 5 minutes.

The copolymerization may take place in the reactors known for the preparation of polyoxymethylenes. Typically, use is made of tubular reactors designed with static mixers, the reactors being of temperature-controllable and pressure-tight design.

After the polymerization, the polymerization mixture is further treated in a manner which is usual per se. The polymerization is usually followed by deactivation, devolatilization, and compounding of the mixture.

Deactivation takes place via addition of deactivators to the reaction mixture. Examples of these are ammonia, amines, alcohols, or basic-reaction salts.

In one particular embodiment of the process of the invention, the resultant block copolymer is treated, after the preparation process, with water and/or with a water-soluble alcohol, such as methanol, at from 30 to 100° C., preferably at from 50 to 80° C. The result is extraction of block components and monomer residues physically bound within the reaction mixture, and an improvement in the mechanical properties of moldings.

These steps are known per se to the person skilled in the art and are described by way of example in EP-A-080656.

The preferred block copolyoxymethylenes have melting points of at least 150° C. and molecular weights (number-average) $M_n$ in the range from 50.000 to 300.000, preferably from 70.000 to 200.000.

Particular preference is given to end-group-stabilized polyoxymethylenes which contain, at the ends of the chains, alkoxy groups, formate groups, hydroxyalkylene groups, or a combination of two or more of these radicals.

The block copolyoxymethylenes used generally have a melt index (MVR 190-2.16, ISO 1133) of from 1 to 50 $cm^3$/10 min.

The block copolyoxymethylenes of the invention may be used for moldings of any type, in particular for processing by means of injection molding or an extruder.

The invention therefore also provides the use of the block copolymers for the abovementioned purposes.

Since the block copolymers intrinsically contain flexibilizing components of the formula II, there is usually no need to use impact modifiers, for example elastomeric polyurethanes. However, the addition of such components may be desirable in a particular case, depending on the application intended.

The block copolymers of the invention may comprise other additives known per se, the addition of which may be simultaneous with, or may immediately follow, the preparation of the block copolymers.

Examples of additives are processing aids, such as antioxidants, acid scavengers, formaldehyde scavengers, UV stabilizers, heat stabilizers, adhesion promoters, lubricants, nucleating agents, or mold-release agents, fillers, reinforcing materials, or antistatic agents; or additives which give the molding composition a desired property, for example dyes and/or pigments, and/or additives providing electrical conductivity; or else a mixture of these additives, but there is no intended restriction of the scope to the examples mentioned.

The block copolymers of the invention may be processed by mixing the fine-particle, for example pulverulent or granulated, components, followed immediately by thermoplastic processing, or by mixing the components in heatable mixing assemblies suitable for that purpose. Suitable mixing assemblies and suitable mixing processes are described by way of example in: Saechtling, Kunststoff-Taschenbuch, Hanser Verlag, 27th Edition 1998, pp. 202–217, incorporated herein by way of reference.

The advantageous processing temperatures are usually in the range from 180 to 230° C., advantageously from 190 to 210° C.

The examples below illustrate, but do not limit, the invention. The quantitative data which they give is always in parts by weight unless otherwise stated.

General Operating Specification

Liquid trioxane at 80° C. was copolymerized with dioxolane to which methylal had been added, and also with polyethylene glycol (PEG) with an average molecular weight of 35.000 (number-average) in a tubular reactor with addition of trifluoromethanesulfonic acid as initiator. The copolymerization was carried out at 155° C. and at a pressure of 25 bar.

After 1.5 minutes, the copolymerization was terminated by adding triethylamine, and removal of the unstable chain ends was undertaken at 185° C. for 15 minutes. Porous pellets were produced by die-face cutting at the reactor outlet with substantial vaporization of the residual monomers.

Table 1 shows monomers, their amounts, and properties of the resultant copolymers.

The product was washed with methanol in order to remove the adherent residual monomers. The resultant extracted products were processed by extrusion to give moldings.

In an alternative extraction step, after milling to a grain diameter of 500 $\mu$m the product was extracted with methanol at 60° C. for 20 minutes. The methanol was separated off by way of a centrifuge, and an extruder was used to devolatilize and extrude the polymer.

TABLE 1

Composition of copolymers prepared

| Example No. | Trioxane (% by weight) | Dioxolane (% by weight) | PEG in reaction mixture (% by weight) | Initiator concentration (ppm) | MVR ($cm^3$/ 10 min) |
|---|---|---|---|---|---|
| 1.1 | 91.6 | 3.4 | 5 | 5 | 4.88 |
| 1.2 | 91.6 | 3.4 | 5 | 6 | 5.03 |
| 1.3[1)] | 91.6 | 3.4 | 5 | 6 | 11.93 |
| 2 | 86.6 | 3.4 | 10 | 8 | 32 |

[1)]was worked up by hot extraction with methanol

The PEG content of the resultant block copolymers was determined by $^1$H NMR spectroscopy. The specimen was dissolved in hexafluoroisopropanol (HFiP-$D_2$) and studied at 310 K.

The mechanical properties of the moldings produced from the block copolymers of the invention were determined as follows:

Tensile stress at break to ISO 527-2

Yield stress to ISO 527-2

Notched impact strength to EN ISO 179-1

Tensile strain at break to ISO 527-2

Yield strain to ISO 527-2

Modulus of elasticity to ISO 527-2

Density to EN ISO 1183-1

Volume melt index MVR 190/2.16 of 8 $cm^3$/10 min to EN ISO 1133.

The test results are listed in Table 2 below.

TABLE 2

Properties of copolyoxymethylenes and comparative examples

| Example No. | PEG content[3] | Tensile stress at break (MPa) | Yield stress (MPa) | Notched impact strenght (kJ/m$^2$) | Tensile strain at break (%) | Yield stain (%) | Modulus of elasticity (MPa) | Density (g/l) |
|---|---|---|---|---|---|---|---|---|
| 1.1 | 4.28 | 50.95 | 59.1 | 9.55 | 39.67 | 13.67 | 2027 | 1.393 |
| 1.3 | 2.69 | 58.21 | 61.8 | 10.34 | 26.71 | 12.03 | 2434 | n.d. |
| 2 | 10.81 | 46.82 | 53.5 | 6.5 | 37.19 | 10.57 | 1958 | 1.385 |
| V1[1] | — | 52.8 | 64.4 | 7.12 | 35.7 | 10.5 | 2650 | 1.41 |
| V2[2] | — | n.d. | 53 | 12 | 32 | 9 | 2100 | 1.39 |

[1] commercially available POM; Hostaform® C9021
[2] commercially available impact-modified POM; Hostaform® S9063
[3] determined by $^1$H NMR

The invention claimed is:

1. A process for preparing a copolymer containing 70 to 99% by weight based on the copolymer of polyoxymethylene blocks of the structural repeat units of the formula I and from 1 to 30% by weight blocks containing structural units of the formula II

[—O—CH$_2$—]$_x$      (I),

[—O—R$^1$—]      (II), where R$^1$ is a divalent radical derived from a hydroxy-terminated aliphatic or cycloaliphatic oligomer or polymer which optionally has ether groups and/or carbonyloxy groups in the chain, and x is a whole number, at least 10 encompassing the following measures:
(i) forming an initial charge from monomers which form —O—CH$_2$— units together with monomers of the formula V

HO—R$^1$—OH      (V), where R$^1$ is as defined above, together with a catalyst usually used for polymerizing the monomers forming the —O—CH$_2$— units, and optionally together with a solvent, and/or with regulators, and
(ii) carrying out the copolymerization at a temperature of from 120 to 300° C. and at a pressure of from 2 to 500 bar.

2. The process as claimed in claim 1, wherein x is a whole number from 500 to 10,000.

3. The process as claimed in claim 1, wherein said polyoxymethylene blocks also contain structural repeat units of the formula III —(C$_y$H$_{2y}$—O—)$_z$      (III), besides the structural repeat units of the formula I, where y is a whole number from 2 to 4, and z is a whole number from 1 to 3.

4. The process as claimed in claim 1, wherein R$^1$ is a —C$_m$H$_{2m}$—O—)$_r$—C$_m$H$_{2m}$— radical, m is a whole number from 2 to 4, and r is a whole number from 20 to 1,500.

5. The process as claimed in claim 4, wherein m is 2.

6. The process as claimed in claim 1, wherein the resultant block copolymer is treated, after the preparation, with water and/or with a water-soluble alcohol at from 30 to 100° C.

7. The process as claimed in claim 1, wherein x is a whole number from 1,500 to 5,000.

8. The process as claimed in claim 1, wherein R$^1$ is a —(C$_m$H$_{2m}$—O—)$_r$—C$_m$H$_{2m}$— radical, in is a whole number from 2 to 4, and r is a whole number from 50 to 1,000.

9. The process as claimed in claim 1, wherein the resultant block copolymer is treated, after the preparation, with water and/or with a water-soluble alcohol at from 50 to 80° C.

10. The process as claimed in claim 1, wherein said blocks composed of homo- or copolyoxymethylenes in the copolymer of the formula I is from 80 to 95% by weight, and the proportion of structural repeat units of the formula II is from 5 to 20% by weight, based on the copolymer.

11. The process as claimed in claim 1, wherein said polyoxymethylene blocks are prepared by reacting trioxane with a cyclic ether and with a third monomer of the formula

R$^2$—CH$_2$—Z—CH$_2$—R$^2$—, where R$^2$ and R$^2$, independently of one another, are radicals of the formula IVa, IVb, or IVc

(IVa)

(IVb)

(IVc)

wherein Z is a chemical bond, —O—, or —O—R$^3$—O— and

R$^3$ is C$_2$–C$_8$-cycloalkylene.

12. The process as claimed in claim 1, wherein the copolymer further contains from 0.1 to 20 mol %, based on the copolymer, of co-components which are derived from ethylene oxide, propylene 1,2-oxide, butylene 1,2-oxide, butylene 1,3-oxide, 1,3-dioxane, 1,3-dioxolane, and 1,3-dioxepan.

13. The process as claimed in claim 1, wherein the copolymer further contains from 0.5 to 10 mol %, based on the copolymer, of co-components which are derived from ethylene oxide, propylene 1,2-oxide, butylene 1,2-oxide, butylene 1,3-oxide, 1,3-dioxane, 1,3-dioxolane, and 1,3-dioxepan.

14. The process as claimed in claim 1, wherein the copolymer contains polyoxymethylene blocks of the structural repeat units of the formula I in an amount from at least 80% by weight.

15. The process as claimed in claim 1, wherein the copolymer contains polyoxymethylene blocks of the structural repeat units of the formula I in an amount from at least 90% by weight.

* * * * *

UNITED STATES PATENT AND TRADEMARK OFFICE
CERTIFICATE OF CORRECTION

| | | |
|---|---|---|
| PATENT NO. | : 7,001,959 B2 | Page 1 of 1 |
| APPLICATION NO. | : 10/700195 | |
| DATED | : February 21, 2006 | |
| INVENTOR(S) | : Karl-Friedrich Mück et al. | |

It is certified that error appears in the above-identified patent and that said Letters Patent is hereby corrected as shown below:

In the Claims:

In Claim 8, at column 8, line 22, "–$(C_mH_{2m}-O-)_r-C_mH_{2m}$- radical, in is a whole" should read -- –$(C_mH_{2m}-O-)_r-C_mH_{2m}$- radical, m is a whole--

In Claim 11, at column 8, line 57, "$R^3$ is $C_2$-$C_8$-cycloalkylene." should read -- $R_3$ is $C_2$-$C_8$-alkylene or $C_2$-$C_8$-cycloalkylene.--

Signed and Sealed this

Eighth Day of August, 2006

JON W. DUDAS
*Director of the United States Patent and Trademark Office*